United States Patent [19]

Zortea et al.

[11] Patent Number: 4,900,337
[45] Date of Patent: Feb. 13, 1990

[54] METHOD AND APPARATUS FOR WORKING MOLTEN GLASS

[75] Inventors: Michel Zortea, Chalon-sur-Saone; Robert Noiret, Mantes-la-Jolie; Gerard Dossier, Lesigny, all of France

[73] Assignee: Saint-Gobain Vitrage, Courbevoie, France

[21] Appl. No.: 233,638

[22] Filed: Aug. 18, 1988

[30] Foreign Application Priority Data

Aug. 18, 1987 [FR] France ................................ 87 11666

[51] Int. Cl.[4] .............................................. C03B 5/20
[52] U.S. Cl. ........................................ 65/135; 65/136; 65/337; 65/342; 65/343; 65/345
[58] Field of Search ................. 65/345, 343, 342, 337, 65/135, 136

[56] References Cited

U.S. PATENT DOCUMENTS

| 3,888,650 | 6/1975 | Gell et al. | 65/135 X |
| 4,029,489 | 6/1977 | Froberg et al. | 65/136 |
| 4,594,089 | 6/1986 | Kurata | 65/337 |

Primary Examiner—Arthur Kellogg
Attorney, Agent, or Firm—Pennie & Edmonds

[57] ABSTRACT

The invention relates to working molten glass in tank furnaces for continuous production. According to the process of the invention, the vitrifiable material being brought first to the molten bath state in a zone upstream from the tank, and said bath then having access to the successive downstream zones allocated to the other phases of the process of working the glass through at least one tank portion comprising a section reduction of the type usually called a neck, there is generated at the upper level of the opening available to the glass by said neck a glass current directed from downstream to upstream of said neck. The invention proves to be especially advantageous for electric melting furnaces with large production capacity.

42 Claims, 4 Drawing Sheets

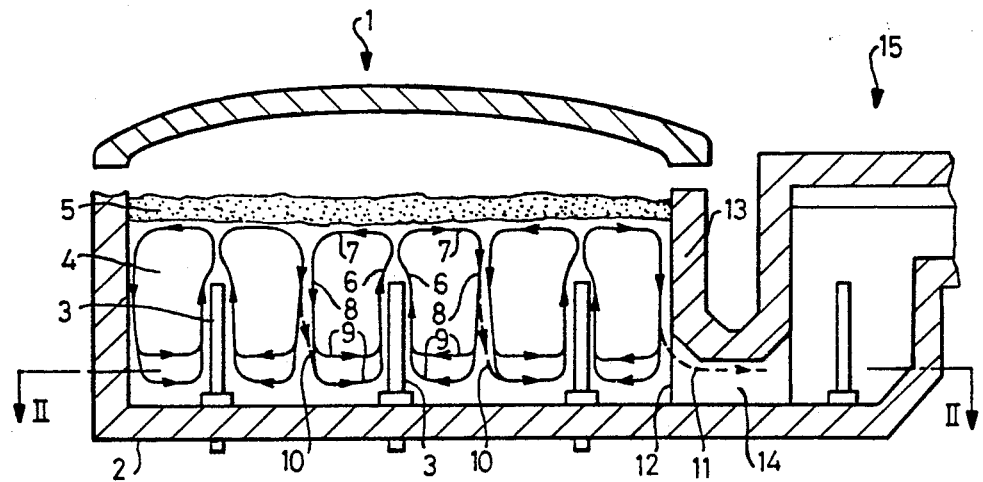
FIG_1
PRIOR ART
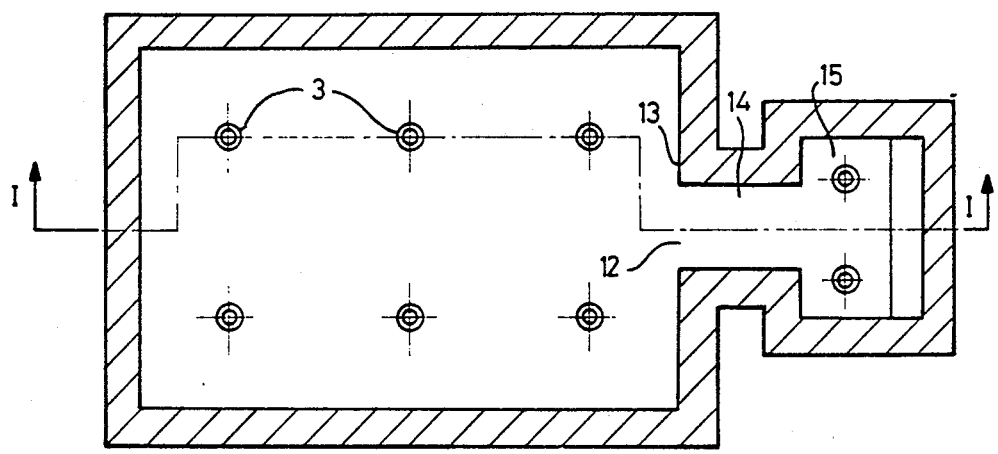
FIG_2
PRIOR ART

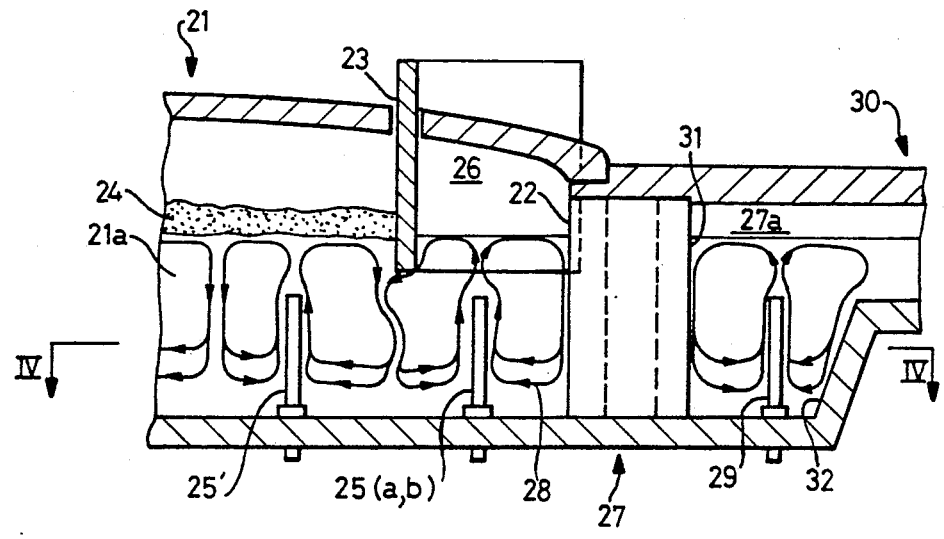
FIG_3
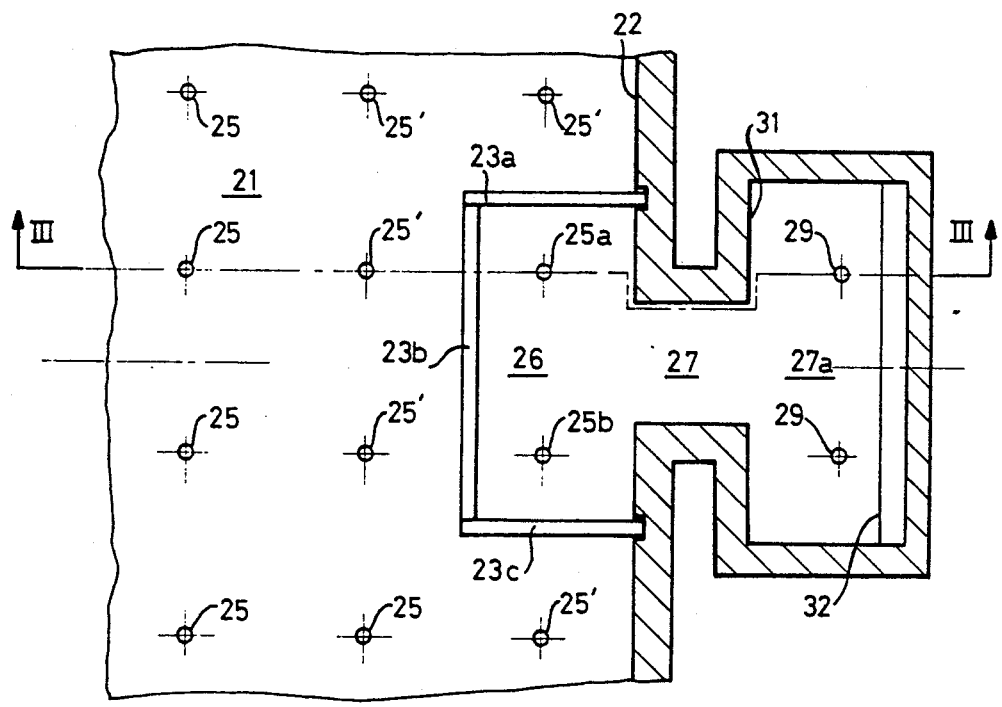
FIG_4

METHOD AND APPARATUS FOR WORKING MOLTEN GLASS

BACKGROUND OF THE INVENTION

This invention relates to the production of glass in a continuous installation in which the different phases of the process, essentially melting, fining and conditioning, take place during a movement of the material through relatively delimited successive zones of the installation.

Means are described to improve the partitioning between said zones and in particular to regulate the flow of molten glass from one chamber to another. This increase in partitioning produces better control over each of the process phases.

The invention relates more particularly to tank furnaces with large production capacities, i.e., on the order of 600 t/d or more for float glass or 300 t/d for hollow glass. This invention also proves advantageous for smaller installations and especially where there are strict requirements with regard to the quality levels of the fining and/or chemical and thermal homogeneity of the glass which is to be supplied to the shaping devices.

The specific design and operation of the industrial installations vary. However, all installations attempt to separate and keep independent the melting process from the conditioning process.

Such independence and separation is obtained, for example, by connecting the melt tank to the conditioning tank by a submerged throat. As a result the two compartments are not exposed to either to the outside atmosphere or to each other's atmosphere. The throat is a common structure used in installations that produce hollow glass and installation fiber.

In contrast, glass furnaces that produce flat glass with high production capacities usually contain a neck that connects the melting and cooling-down compartments. The neck is a section whose crown is not in contact with the glass bath.

Utilization of a throat offers certain advantages over that of a neck. The throat guarantees the independence of the atmospheres of the two compartments. This favors the production of glass from the melting tanks which exhibit a better fining quality and/or is colder since it is located closer to the bottom of the bath. However, since the section of the throat is limited in practice by the maximum dimensions of the pieces of the crown which the refractory industry is currently able to produce, the throat is only able to be used in furnaces whose pull does not exceed about 200 t/d.

Therefore, tank furnaces in the flat-glass industry, whose production capacity exceeds over 600 t/d cannot use the preferred throat section but rather must resort to using a section called a neck. An extension of the tank is used to remedy some of the drawbacks that occur with regard to the quality of the glass produced as a result of using a tank furnace which comprises a neck as opposed to a throat. This extension is devoted to the conditioning process and creates a strong longitudinal convection belt with a surface current and a bottom current. The surface current is five to ten times the pull, and is directed downstream, reaching the extraction zone after having passed previously through both the neck and the conditioning tank. The bottom current of the convection belt, which is only reduced by the pull, travels the opposite path.

These convection currents subject the refractory pieces that constitute the neck to considerable wear and thus shorten their life. The convection currents also prove very costly in terms of energy loss. They involve several thermal cycles of cooling and heating of the glass between the fining and cooling-down temperatures prior to the glass being removed for shaping. It is the object of the present invention to remedy, or at least reduce substantially, the drawbacks of each of the structures described above.

SUMMARY OF THE INVENTION

It is the object of this invention to improve the continuous process of working glass in a tank furnace. The vitrifiable material is first brought into the molten bath state in a zone upstream from the tank allocated to the melting process. The glass travels through the bath eventually reaching the downstream zones of the tank. These downstream zones are allocated to different ones of the other phases of the glass working process, which include fining and conditioning for shaping. To get from the upstream part of the tank to the downstream zone, the glass must pass through at least one portion of the tank comprising a section reduction of the type usually called a neck. The passage of the glass through the neck produces a surface return current. This is a current that travels from the downstream zone of the tank, through the neck, and continues into the upstream portion of the tank.

According to this invention, the return current is advantageously generated by a regulated heating in the glass of the downstream zone of the tank. The heating is preferably generated by localized energy dissipation by a Joule effect in the glass itself, aided by at least one electrode which is immersed in the bath in the downstream zone.

According to an advantageous characteristic of this invention, a partition is included to help separate the atmosphere and/or radiation between the upstream zone and the downstream zone of the neck. This partition is preferably located close to the upstream opening of the neck intake and extends upstream in the molten glass bath at least to one layer of the vitrifiable materials which are supernatant on the surface of the bath. This enables the return current to reach the zone located vertical to the partition.

Preferably the partition that is used leaves a free passageway for the glass bath that is at least 80% the depth of the bath vertical to the partition. It is also preferable that the extraction of the glass from the melt zone is essentially performed by a current that is located at a mid-depth level of the bath vertical to the partition. Also, the distance between the surface return current and the extraction current which provides the pull directed downstream is such that the level where the horizontal speed component of the glass is zero is preferably located at least 90% of the height of the free passageway of the bath vertical to the partition. This level will minimize wear of the partition.

In a particularly advantageous use of this invention, the vitrifiable mixture introduced into the tank of the furnace is distributed over the entire bath zone upstream from the first partition. The upstream bath zone is heated by a Joule effect in the glass itself and thus performs a so-called "cold crown" melting process. In this process, it is preferred that the glass travelling downstream from the first partition is heated in order to bring the glass to at least its usual fining temperature. This will completely eliminate the gas bubbles that appear in the bath during the melting process or which are introduced into the bath by way of the vitrifiable mixture itself.

This invention also has as its object a device for the continuous working of molten glass by employing the process described above. A tank furnace of elongated general shape comprises a plurality of compartments through which the glass bath passes in series. Each of these compartments is especially allocated to one of the main phases of glass working which include the melting of the glass and its conditioning for shaping. At least a portion of the tank comprises a section reduction, usually called a neck, which connects the upstream and the downstream compartments. This device further comprises the means necessary to generate a surface return current downstream from the opening of the neck of the upstream compartment. This surface return current travels from the downstream zone of the tank, through the neck, and returns to the upstream compartment.

The surface return current can be generated by localized heating of the glass bath which produces a thermosiphon effect known to the art. This will produce a convection current which, diagrammatically, loops around itself in a belt-like manner. The localized heating is produced by at least one electrode that is immersed in the glass bath downstream from the neck opening on the upstream compartment.

It is preferable that the partition at the upstream opening of the neck comprises at least one vertical wall that is vertically movable. This vertical wall will constitute a partition between the upstream and the downstream zones of the tank with respect to the atmosphere prevailing above the bath.

It is also preferable that an electrode is located at a distance from the partitioning wall of less than three times the depth of the bath at the site of the electrode, preferably between 0.5 and 2 times said depth.

It is advantageous to this invention for the partitioning wall to be further adjustable in height so that it is adaptable to both the level of the glass bath and to the thickness of the vitrifiable materials possibly present at its surface. This will allow the partition to assure a seal, if necessary, by its mere contact with the supernatant layer, or it will allow the partition to be immersed in the bath to a depth of 20% of the depth of the bath.

A plurality of electrodes, preferably placed in the same crosswise plane improves the homogeneity of the surface return current over the width of the passageway available to the glass. When the neck comprises a small width, the electrodes can be positioned horizontally, passing through the duct from one edge to another. At least two electrodes must be used in order to produce the proper degree and direction of energy dissipation at this level. When a device is employed using a plurality of vertical electrodes aligned crosswise, the interval between the electrodes is preferably between 0.8 and 1.2 times the width of the neck.

Furthermore, in order to improve the quality level of the extracted glass and to free it from the impact of the pull, the invention provides for advantageously placing electrodes upstream from the partition wall. These electrodes are partitioned so that the convective loops associated with the electrodes that generate the return current balance the latter and contribute to its regulation while intensively mixing the glass arriving at this level.

According to another advantageous characteristic of the embodiment of the device of the invention, the neck comprises a threshold of a height on the order of 5 to 15% of the height of the bath, close to vertical to said partition wall. This threshold favors said mixing and the regulation of the convective loop associated with the return current.

According to a particularly advantageous embodiment of this device, the invention comprises a melting compartment, upstream from the partition wall. The melting compartment is equipped with electrodes that can be plunged into the glass bath either through its bottom or through its walls or even from above the bath. These electrodes provide a means of supplying power that matches the melting capacity intended for the furnace. In addition, they comprise a means for the distribution of the vitrifiable mixture over the melting bath in the tank zone upstream from the partition wall.

In this particular application of the invention, the partition wall can provide its sealing function with respect to the atmosphere by being flush only with the surface of the bath. This is due to the layer of pulverulent vitrifiable materials subjected to melting which rests on the walls of the bath. Simultaneously, the return current generated by the downstream electrodes also opposes the passage of unmelted material.

In practice, especially in the case of the application of this invention to a "cold crown" glass melting installation, i.e., one in which the zone located upstream from the partition wall is covered entirely by a layer of vitrifiable materials, it is convenient to perform the regulation of the return current by using measurements of the glass temperature on both sides of the wall. For example, about ten centimeters from it, and at a shallow depth in the bath, for example, five centimeters, the existence of the return current is reflected by higher temperatures downstream than upstream from the wall. A correlation can easily be made between the difference between the temperatures and the characteristics of the return current.

Old installations can easily be modified to use this invention. However, when this invention is incorporated in a new furnace beginning with the design stage, a simpler and less expensive structure results. The replacement of the immersed throat commonly used in tank furnaces by a neck provided with a barrier of the skimbar type that is vertically mobile and that opposes a supernatant layer of vitrifiable materials, produces much larger passageway sections for the glass and consequently results in the development of furnaces with large production capacities. For example, furnaces used for working high-quality glass can now have production capacities greater than 400 t/d.

BRIEF DESCRIPTION OF THE DRAWINGS

These and other objects, features and advantages of the present invention will be more readily apparent from the following detailed description of a preferred embodiment of the invention in which:

FIG. 1 is a longitudinal elevation view, along I—I of FIG. 2, of a cold crown glass electric melting furnace of the prior art;

FIG. 2 depicts a horizontal section of this same furnace, along II—II of FIG. 1;

FIG. 3 depicts a longitudinal elevation section of the invention along III—III of FIG. 4;

FIG. 4 depicts a horizontal section of this same invention along IV—IV of FIG. 3;

DETAILED DESCRIPTION OF PREFERRED EMBODIMENT

Figure 5:
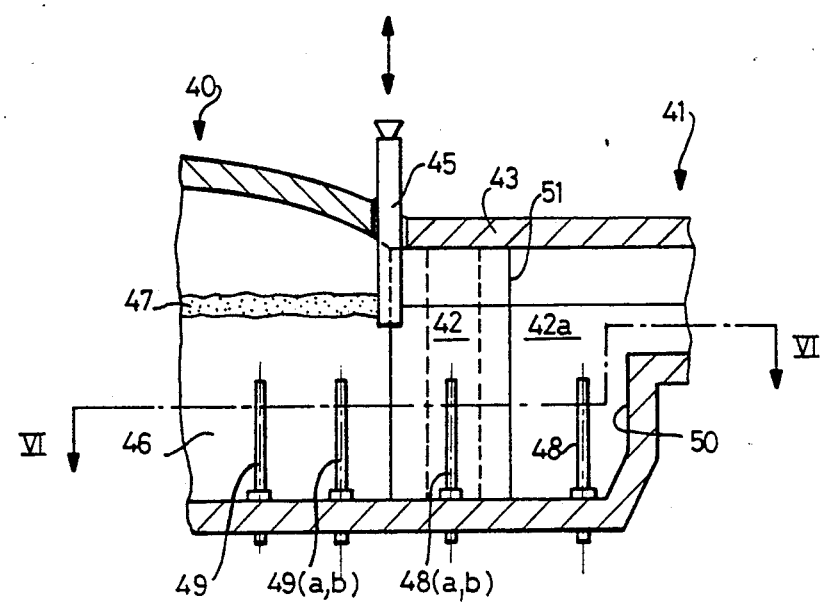
FIG. 5 depicts a second longitudinal elevation section of the invention along V—V of FIG. 6.

FIGS. 1 and 2 represent diagrammatically in sections the cold crown electric furnace of the prior art which comprises a melting tank 1 whose bottom 2 is provided with two rows of three vertical electrodes 3. These electrodes are installed in a square mesh distribution of the type described by the publication of French patent No. 2,552,073, comprising electric connections (not shown) providing a rather uniform energy dissipation from one electrode to the next. The temperature of bath 4 of molten glass can thus be regulated to a value practically identical from one area to the next. Supernatant layer 5 of vitrifiable materials is subjected to the action of convection currents associated with each of the electrodes, which are represented diagrammatically in the form of arrowed loops. The fastest of these convection currents follow a path exhibiting, according to a section through a plane containing the axis of an electrode, a design shaped like an umbrella: the handle corresponds to rising currents 6 reaching electrode 3, and the fabric represents the centrifugal radial currents 7 which provide the essential of the transfers of heat and material between molten bath 4 and pulverulent supernatant layer 5.

Centrifugal currents 7 are cooled on contact with said supernatant layer 5, while being charged with new glass. As they travel away from electrode 3 which has generated them, their speed is reduced, then, when they encounter currents 7 associated with a neighboring electrode or wall, they are deflected into descending currents 8. The latter, during their travel in the direction of the bottom, give rise to centripetal currents 9 which are distributed over a greater depth than centrifugal currents 7. As a result of the suction effect that rising currents 6 exert, the material is carried in a new path of the same convective loop, with a general toric shape, similar to that prevailing in a washer in operation.

The description given here of the toric convective loop associated with each electrode is necessarily somewhat diagrammatic. This convection regime possesses notably greater speeds in the upper areas of the bath than in the lower part of the bath where the worked glass settles. At the level of currents 9, the transfer of glass takes place in practice as follows: it goes from one convective loop to its neighbor by currents 10 (represented in short broken lines in FIG. 1), and gradually it is extracted from the tank by a current 11 through a lateral extraction orifice 12 in a lateral wall 13. Orifice 12 opens on an extraction throat 14 which exits into conditioning compartment 15.

This representation of the interaction between neighboring convective loops, in their state of equilibrium or mutual support, illustrates the limitations on the transfer of material from one loop to the next in the lower part of the bath. This subjects the transferred material to a new mixing at each convective loop it passes through.

FIGS. 3 and 4 represent a furnace that has been modified according to the present invention.

This modification comprises placing suspended walls 23(a,b,c) in the upper part of tank 21, attached to downstream wall 22 and extending into molten glass bath 21a. These suspended walls 23(a,b,c) partition the atmosphere of tank 21 and contain the supernatant layer 24 of vitrifiable materials which have been subjected to the melting process. These partitions 23 are inserted into the regular mesh of electrodes 25, of which only four modules of three electrodes have been represented, to define a homogenizing compartment 26 that is free of the supernatant layer 24. Compartment 26 is also provided with two electrodes 25a and 25b which are placed symmetrically relative to the vertical longitudinal plane of symmetry of the extraction neck 27. Neck 27, a reduced section compartment Neck 27 has a narrowed width but open top section and is a replacement of the immersed throat of the furnaces of the prior art. This arrangement provides improved operation and eliminates the serious deterioration of the top wall of the throat that would normally occur in the type of tank furnaces depicted in FIGS. 1 and 2. This invention further provides an increased section for the flow of extracted glass, which permits the output by such a transformation to be greatly increased, all the more so because cooling of the glass occurs to a much lesser extent in extraction neck 27 than it does in extraction throat 14.

Toric convective loops 28, which are associated with electrodes 25a and 25b of compartment 26, are regulated so as to balance the convective loops associated with electrodes 25 of melting compartment 21. Convective loops 28 oppose the direct passage of new glass worked by adjacent electrodes 25', next to walls 23(a,b,c), and impose an additional mixing effect on the glass before it reaches the input of neck 27. The glass output of the convective loop associated with electrodes 25a and 25b is preferably regulated to a value at least equal to the output of the convective loops of each of upstream adjacent electrodes 25'.

In order to produce a greater efficiency of the screw effect resulting from convective loops of the downstream electrodes 25a and 25b, which are opposite the convective loops of upstream electrodes 25', it is preferable to place the suspended partitions 23(a,b,c) at a distance closer to electrodes 25(a,b) than to electrodes 25'. When an equal amount of electric power is applied to these different electrodes, the downstream convective loops associated with electrodes 25(a,b) deliver at the foot of said partitions, as shown in FIG. 3, more intense flows and hotter glass than those of the loops that are opposed to them by the upstream electrodes 25'. Thus a surface return current is created at right angles with said walls. It is then possible to raise said walls to make them flush only with the surface of the glass bath. This eliminates the drawbacks mentioned earlier such as the direct passage of unmelted materials.

In an advantageous embodiment of the invention, complementary electrodes 29 are placed downstream from neck 27 in its spread 27a preceding conditioning compartment 30. Electrodes 29 are placed in compartment 27a at a distance from its upstream wall 31 preferably greater than their distance from downstream wall 32 of compartment 27a, constituting the spread of neck 27. Thus, the convective loops associated with electrodes 29 can themselves, to a certain extent, contribute to the effectiveness of those that are associated with electrodes 25(a,b). Electrodes 29 further have the function of assuring a homogeneous heating of the glass coming into compartment 27a. They can also complement the glass fining by regulating the maximum level and speed of this heating according to the specification of French patent application No. 2 550 523.

Figure 6:
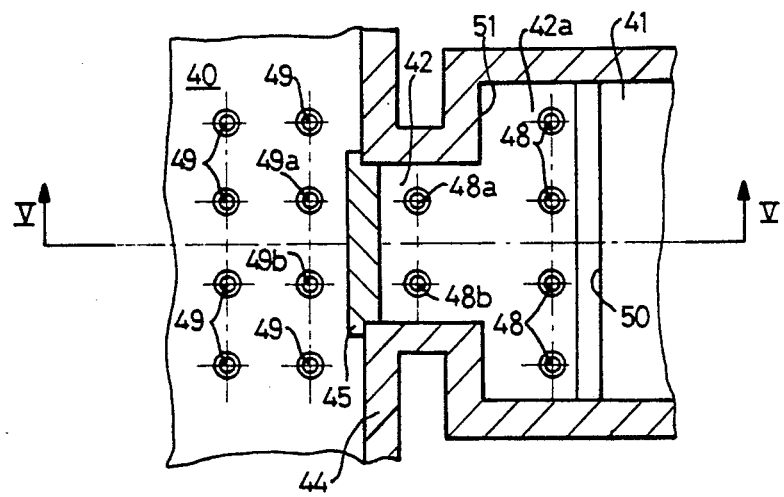
FIG. 6 depicts a horizontal section of this same invention along VI—VI of FIG. 5.

FIGS. 5 and 6 represent partial diagrammatic sections, longitudinal in elevation and horizontal, respectively, of a further embodiment of this invention. Melting tank 40 is connected with downstream compartment 41, which is intended for conditioning the glass before shaping, by a neck 42 and its spread 42a with hot crown 43. Neck 42, which has its opening made in downstream lateral wall 44 of tank 40, is provided in the upper part with a barrier 45 that is not immersed or that is only slightly immersed in the glass bath 46. Barrier 45 is essentially intended to contain supernatant layer 47 of vitrifiable materials deposited on bath 46 in melting tank 40. The height of barrier 45 is preferably adjustable to avoid any direct passage to neck 42 of solid materials of supernatant layer 47.

According to the invention, two electrodes 48a and 48b, are placed immediately downstream from barrier 45, i.e., at the intake of neck 42. These electrodes are slightly closer to barrier 45 than electrodes 49a and 49b which are located immediately upstream from the barrier.

Furthermore, the dimensional characteristics and the mode of electric supply of the electrodes are selected so that the convective loops associated with the electrodes placed opposite each other in pairs upstream and downstream from the barrier, that is 49a/48a and 49b/48b, respectively, can be adjusted to balance each other, with a slight superiority of the flows of the downstream loops over the flows of the upstream loops. This arrangement opposes the direct passage of new glass worked by electrodes 49a and 49b adjacent to barrier 45 immediately upstream from it.

Under such conditions and for the nominal pull of the furnace, barrier 45 advantageously is raised into such a position that its bottom is no longer immersed in bath 46 but rather it is located, for example, several millimeters to several centimeters above the interface with the supernatant layer of vitrifiable materials. In this way the combined upstream/downstream convective loops of the barrier and the general homogeneity of the mixing in melting tank 40 are only slightly disturbed. Furthermore, the wear of barrier 45 becomes very slight in comparison with that of the pieces of the "cover" of an extraction throat of the usual art, such as throat 14, of FIGS. 1 and 2, which is generally cooled very vigorously. Finally, this mode of operation facilitates both a visual checking of the equilibrium between downstream and upstream convective loops and an adjustment of the injected electric power and its distribution.

When the production of the furnace is lowered, possibly "banked," the height of barrier 45 will advantageously be adjusted to avoid contact with the bath and the electric power that is applied to the combined upstream/downstream electrodes will be reduced. However, said electric power is always maintained at a sufficient level to avoid devitrification of the glass.

When production of the furnace is returned to normal operation, barrier 45 will first be lowered to penetrate into the bath to a depth at least equal to the thickness provided by the supernatant layer. The power applied to downstream electrodes 48 (a, b) will then be increased. This is done by increasing the power applied to the downstream electrodes before increasing the power applied to the upstream combined electrodes 49 (a, b) and the electrodes of melting zone 49.

According to an advantageous embodiment of this invention, it is possible to place in spread 42a of neck 42 additional electrodes 48 downstream from electrodes 48(a,b) as shown in FIGS. 5 and 6. The electrodes' electric power supply means and position are such that associated convective loops can act as support for electrodes 48(a,b). It is for this purpose that these electrodes 48 preferably are aligned in one or more crosswise rows, installed at a shorter distance from downstream crosswise wall 50 of spread 42a than from its upstream crosswise wall 51. These additional electrodes 48 complete the mixing of the extracted glass and also make possible an improvement in fining quality by subjecting the glass that comes into their convective loops to a suitable heating.

These electrodes also have the function of isolating electrodes 48(a,b) from actions optionally applied to the glass of conditioning compartment 41. They also help to control of the function of partitioning between melting compartment 40 and conditioning compartment 41 by limiting the exchange of material between the compartments to the sole pull current. The latter is advantageously confined to the middle level and optionally to the vicinity of the bottom under conditions that will be examined below connection with FIG. 8.

It should be noted that the pull current drains the sum of the elementary pulls of each of the melting cells represented by the convective loops associated with each electrode 49 of the melting compartment. This is accomplished by the plurality of exchange currents from cell to cell, causing the temperature in the middle level in the exchange currents to be very uniform over the extent of the bottom. This is also true for the pull current passing through neck 42, which is thus in an excellent position for an additional fining to be applied to it by electrodes 48.

Another advantage of electrodes 48 resides in the ease they provide for hot distributions over barrier 45 or, if necessary, its replacement.

For such interventions, it will be advantageous to use a temporary auxiliary barrier, for example, formed by a cooled metal structure, which isolates the atmosphere of neck 42 and compartment 41 from the atmosphere of tank 40. However, the interventions on barrier 45 have a minimal effect on the quality of the extracted glass since the amount of materials of the supernatant layer able to escape to neck 42 is small when electrodes 48(a,b) are suitably supplied.

The use of the invention is generally applicable but proves especially advantageous for cold crown furnaces. In cold-crown furnaces, the melting of the charge is obtained with electrodes that enter the tank either through its bottom or through its walls or from electrodes suspended above the tank which will penetrate into the molten bath passing through the supernatant layer of vitrifiable materials. It is preferable in this last case, that the suspended electrodes are specially protected with regard to the oxidizing atmosphere when they are intended to be located downstream from barrier 45. The electrodes going through the bottom, both for downstream electrodes 48(a,b) and for combined upstream electrodes 49(a,b) placed immediately upstream from barrier 45, are able to provide a certain symmetry relative to barrier 45 between combined upstream and downstream convective loops. The latter variant simplifies the structure of hot crown 43 of neck 42, where maintenance and electric connection of the suspended electrodes are more complex to implement than in the cold crown compartment.

The invention obviously provides greater advantages the greater the melting capacity of the furnace. This is because of the limitation of the section of the standard extraction throats, mentioned above. This is due to the difficulties of production of large-sized refractory pieces that exhibit a sufficient level of hot mechanical strength which are necessary for the elements of the throat "cover," which forms the crown.

Construction of a neck, on the other hand, does not have the same difficulties since the suspended barrier 45 can consist of an assembly of thin pieces of relatively simple shape, which consequently will resist temperature variations well. In addition, when placed edgewise, the barriers are not stressed much from a mechanical viewpoint. This allows for adoption of neck widths on the order of 1.2 to 3 m for furnaces of 400 t/d to 800 t/d.

Furthermore, the choice of the dimensions of neck 42 are not only linked to the maximum production capacity of the furnace and the life desired for barrier 45, but are also related to the properties of the glass to be made and the type of functioning provided for the furnace (e.g., size of pull variations . . . ), etc.

The choice of materials to be used for the construction of the neck as well as the barrier itself also depends on some of these elements. For example, the production of clear glass will generally require proscribing refractories rich in Cr2O3 yet more resistant to corrosion. The effects of this stress on the barrier will be minimized by limiting as much as possible the electric power applied to downstream electrodes 48(a,b). This is aimed at obtaining hydrodynamic screw which maintains the output of the glass surface return current at strictly sufficient values at the level of the lower edge of the barrier. Also, for the return currents, the temperature and its speed are parameters which are decisive for the characteristics of the barrier. Then, the set of additional electrodes 48 placed downstream from the electrodes which form the screw, permit both an independent regulation of the screw effect and additional fining.

Figure 7:
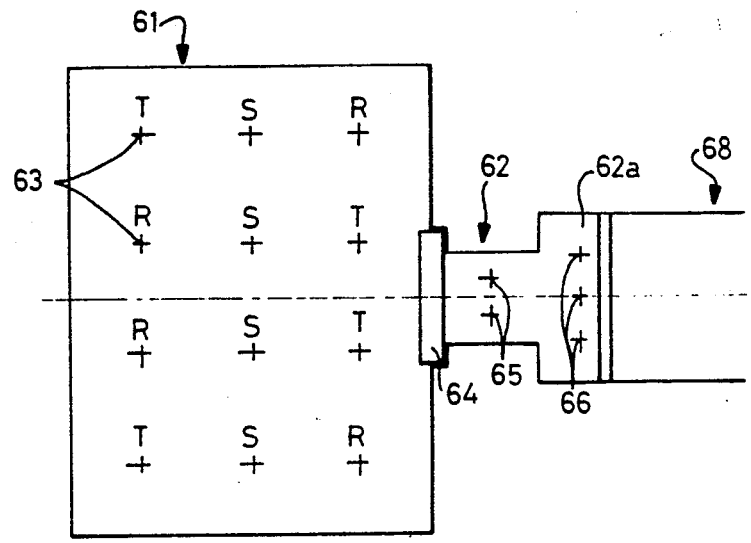
FIG. 7 depicts a plan diagrammatic view of a furnace according to the invention.

FIG. 7 illustrates the characteristics of a furnace according to the invention with a nominal production capacity of 150 t/d of glass intended for the production of float glass.

Melting tank 61, of general rectangular shape comprises a bottom surface area of about 45 m2. Neck 62 which is used for extraction of the molten glass, opens on the widest side of the melting tank and exhibits a longitudinal vertical plane of symmetry merged with that of the tank.

Four modules of three electrodes 63 equip melting tank 61. These electrodes comprise cylindrical molybdenum rods which are placed vertically on the bottom of the tank. Arranged in a square mesh of 1.8 m on each side, they are put in contact with the bath over a length on the order of 0.6 to 1 m, for a bath depth that can vary from 1 to 1.5 m. This depends on the nature of the glass composition and the furnace's intended mode of operation.

The electrodes are supplied three-phase electric current. The voltage is preferably continuously adjustable and able to reach 300 volts between phases. The mode of connection to the phases (R,S,T) is selected to constitute two sets of 6 electrodes, the order of whose phases is reversed (R,S,T;T,S,R), with a symmetry between neighboring sets according to an arrangement already known from French patent application No. 2 550 523.

Melting tank 61 has a neck 62, with an inside width of 1.5 m. Where it opens onto tank 61, neck 62 has an a barrier 64 comprising assembly of refractory pieces which is embedded by its two lateral edges in the wall of tank 61 over a fraction of its thickness. This provides a guidance for the barrier during its height adjustments which are made to impede the vitrifiable materials of the supernatant layer and at the same time separate the atmosphere between the melting tank and neck.

Two electrodes 65 are provided about 0.8 m downstream from barrier 64, i.e., approximately mid-length of neck 62 and in symmetric position relative to the axis of the furnace. These electrodes, which are the same type as electrodes 63, are intended to provide the hydraulic screw effect for the glass at the upper level of section 62, vertical with barrier 64.

Three vertical electrodes 66, going through the bottom of the tank, are installed in spread 62a of neck 62 preceding the conditioning compartment 68. They are positioned analogous to that of electrodes 48 of the furnace represented by FIGS. 5 and 6. The power dissipated by these electrodes 66 is easily adjustable, and is independent of electrodes 65.

The total available power is about 10,000 kVA over the furnace itself, and 300 and 700 kVA, respectively, over the two groups of electrodes 65 and 66. Under production conditions of 150 t/d, the total consumption is about 0.9 kWh/kg of glass, which is very moderate for the very good levels of fining and homogeneity necessary for the production of float glass. This results in a specific production of about 3.3 tons of glass per m2 of melting bottom per day.

At this level of pull, the temperature of the molten glass at the output of melting furnace 61 is set at about 1450° C. It is kept at approximately the same level during its passage through extraction neck 62, and then raised to 1530° C. by electrodes 66 for a superfining of the glass to be delivered for floating.

This mode of operation lengthens the life of the neck. The traditional throat of a furnace of the same capacity with comparable output would be designed with a passage section about 10 times less, causing increased physical erosion and chemical corrosion. Furthermore, because of the cooling usually imposed, the neck would be subjected to substantial variation in temperature resulting in mechanical stresses that are also very prejudicial to its effectiveness and life.

In addition, furnaces which use a throat are limited to production capacities on the order of 300 to 400 t/d. However, the solution according to the invention, which proposes a neck combined with a skim barrier to contain the supernatant charge and which is also provided with at least one convective loop electrode which creates a return current under the barrier, increases its width, thus resulting in very great increases in production capacities.

Figure 8:
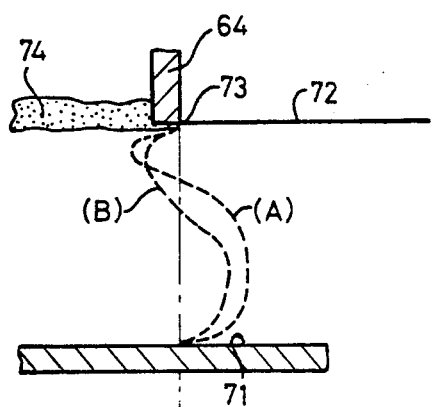
FIG. 8 depicts a diagram representing the speed of the glass, for two different pulls, as a function of the altitude in the glass bath, vertical to the partition wall and in the longitudinal plane of symmetry of the extraction duct.

FIG. 8 represents the variation of the speed of circulation of the glass as a function of the distance from bottom 71 for two operating conditions. This is done for a common configuration of a furnace according to the invention of the type described in FIG. 7. Accordingly barrier 64 is just flush with free surface 72 of the bath. This speed is measured vertically to downstream lower edge 73 of barrier 64 in the vertical longitudinal plane of symmetry of the neck.

Curve A corresponds to the nominal pull of the furnace, and curve B to the operation of the furnace with a smaller pull that is close to simply being banked. The part of the diagram located to the left of vertical of downstream lower edge 73 of the barrier, which is considered a limit for supernatant layer 74, corresponds to a circulation toward the upstream (negative output). The part of the diagram to the right of vertical corresponds to a circulation toward downstream (positive output). The pull of the furnace for a set operating condition is equal to the algebraic sum of the outputs, both positive and negative. This is represented by the arithmetic difference of areas, positive, on the one hand, and negative on the other, between the corresponding curve and the axis of ordinates, of zero abscissa.

In practice, regulation of the currents of return circulation (toward upstream) of the surface is performed essentially for a given furnace structure and set of production conditions (e.g., dimensions of the furnace, dimensions and arrangements of the electrodes, level of the bath . . . ). This is done by adjusting the power applied to the electrodes located downstream from the barrier, and more particularly by adjusting the ratio of this power to that supplied to the melting by comparing the temperatures measured on both sides of the barrier to the levels taken into consideration, i.e., in particular in the upper and lower areas of the bath.

In the embodiments of the device of the invention given above, vertical electrodes are used to create downstream convective loops which provide the hydraulic screw effect. However, the invention is in no way limited to this arrangement of electrodes.

In the case of low-tonnage installations, which do not require a neck of great width, it will be possibly advantageous to use electrodes introduced horizontally through the walls to generate the downstream convective loops. The hydraulic screw effect obtained by the electrodes going through the neck on both sides, in the width direction of the neck, is, for comparable dissipated power, similar to that of vertical electrodes.

What is claimed is:

1. In a continuous process for working glass in a tank furnace of a generally elongated shape having a plurality of compartments through which passes, in series, a molten glass bath, a first upstream compartment having a cover of a pulverulent vitrifiable material and a second compartment located between said first upstream compartment and a downstream compartment and having a reduced section compared thereto, wherein the vitrifiable pulverulent material is brought to a molten state in said first compartment and is transported to successive downstream compartments allocated to other phases of the glass working process and ultimately withdrawn from said tank furnace, the improvement which comprises generating a return current of molten glass directed from downstream to upstream in an upper portion of said second compartment to form a return current to said first upstream compartment, said return current being generated at least in part by an electric current applied to at least one electrode located in said reduced section second compartment.

2. The process of claim 1, wherein said return current is generated by heating the molten glass in the second compartment.

3. The process of claim 2, wherein said heating is obtained by localized energy dissipation by Joule effect in the glass itself, with the help of at least one electrode immersed in the bath in said second compartment.

4. The process of claim 1 wherein said return current is generated by placing a partition in said first upstream compartment to contain the atmosphere and vitrifiable pulverulent material therein, thus forming the first upstream compartment.

5. The process of claim 4, wherein the partition is located close to the opening or intake of the second compartment and reaches the surface of the molten glass bath to prevent the vitrifiable material of the first compartment from entering the second compartment.

6. The process of claim 4, wherein said partition leaves a free passage for the molten glass bath over a height of at least 80% of the depth of the bath vertical to said partition.

7. The process of claim 2, which further comprises heating the molten glass in the first upstream compartment to generate convective loops which limit the generation of convective loops in the second compartment.

8. The process of claim 4, wherein the vitrifiable pulverulent material is introduced into the first compartment of the tank and is distributed over the entire glass bath upstream from said partition.

9. A device for the continuous working of molten glass comprising: a tank furnace of a generally elongated shape having a plurality of compartments through which passes, in series, a molten glass bath; a first upstream compartment having a cover of pulverulent vitrifiable material; a second compartment located between said first upstream compartment and a downstream compartment, said second compartment having a reduced section compared to said upstream and downstream compartments and having no cover of pulverulent vitrifiable material, and means for generating in an upper portion of said second compartment a current of molten glass directed from downstream to upstream to form a return current to said upstream compartment, said means comprising at least one electrode located in said reduced section second compartment to which an electric current is applied.

10. The device of claim 9, wherein said first upstream compartment is formed by at least one partition suspended from an upper portion of said tank furnace, said partition extending into said first compartment and preventing pulverulent vitrifiable material from entering said second compartment.

11. The device of claim 10, wherein said partition is vertically movable.

12. The device of claim 10, wherein said partition comprises means for regulation of the height thereof so that it is possible to immerse said partition in the bath to a predetermined depth of at least 20% of the tank.

13. The device of claim 9, wherein said second compartment further comprises means for providing localized heating of the molten glass therein.

14. The device of claim 13, wherein said localized heating means comprises at least one electrode.

15. The device of claim 13, wherein said localized heating means comprises a plurality of electrodes placed in the same longitudinal plane.

16. The device of claim 15, wherein said electrodes are placed vertically, the interval between end electrodes being between 0.8 and 1.2 times the width of the second compartment.

17. The device of claim 11, wherein said upstream compartment comprises one or more electrodes to generate convective loops of molten glass which limit the generation of convective loops of molten glass from said electrodes of said second compartment.

18. The device of claim 9 wherein said second compartment forms a molten glass homogenizing zone and said downstream compartment forms a molten glass conditioning zone.

19. The device of claim 14, wherein said electrode is located at a distance from said wall of no more than three times the depth of the bath at the site of said electrode.

20. The device of claim 19, wherein the electrode is located at between half and twice said depth.

21. A process for working glass in a tank furnace of a generally elongated shape having a plurality of compartments through which passes, in series, a molten glass bath, comprising:
    generating a current of molten glass directed from a first upstream compartment to a plurality of downstream compartments by forming a molten glass bath in said first compartment and by drawing said molten glass from a downstream compartment of said furnace, the first upstream compartment having a cover of pulverulent vitrifiable material which is distributed over the totality of the surface of said upstream portion, a second compartment being located between the first compartment and a third compartment, and having a reduced section compared to the first and third compartments,
    preventing entry of said pulverulent vitrifiable material into said second compartment by means of a partition that separates an area above said molten glass current and,
    generating a return current directed from downstream into said first upstream compartment by applying a current to at least one electrode located downstream of said partition.

22. The process of claim 21, wherein said return current is generated by heating the molten glass in the second compartment.

23. The process of claim 22, wherein said heating is obtained by localized energy dissipation by Joule effect in the glass itself, with the help of at least one electrode immersed in the bath in said second compartment.

24. The process of claim 22, which further comprises heating the molten glass in the first compartment to generate convective loops which limit the generation of convective loops in the second compartment.

25. The process of claim 21, wherein said partition extends into the first compartment upstream of an intake into said second compartment and said at least one electrode is located downstream of the partition near the intake into the second compartment.

26. The process of claim 21, wherein the partition is located close to the opening or intake of the second compartment and reaches the surface of the molten glass bath to prevent the vitrifiable material from the first compartment from entering said second compartment.

27. The process of claim 21, wherein said partition leaves a free passage for the molten glass bath for at least 80% of the depth of the bath vertical to said partition.

28. The process of claim 21, wherein the vitrifiable pulverulent material is introduced into the first compartment of the tank and is distributed over the entire glass bath upstream from said partition.

29. A device for the continuous working of molten glass comprising:
    a tank furnace of a generally elongated shape having a plurality of compartments through which a molten glass bath passes from a first upstream compartment to a downstream compartment from which it is withdrawn;
    a first compartment located in an upstream portion of said tank furnace having a cover of pulverulent vitrifiable material which is distributed over the totality of the surface of said upstream portion;
    a second compartment located between said first compartment and a third compartment of said tank furnace, said second compartment having a reduced section compared to said first and third compartments;
    a partition means to prevent entry of said pulverulent vitrifiable material into said second compartment; and
    a plurality of electrodes spaced throughout said first and second compartments so that when an electric current is applied to said electrodes a current of molten glass is directed from downstream to upstream to form a return current of some of said glass to said first compartment.

30. The device of claim 29, wherein said third compartment is located between said second compartment and a fourth compartment of said tank furnace and constitutes a spread of said second compartment and said fourth compartment is located in said downstream portion of said tank furnace for conditioning the molten glass.

31. The device of claim 29, wherein said partition means is suspended from an upper portion of said tank furnace, said partition means extending into said first compartment and preventing pulverulent vitrifiable material from entering said second compartment.

32. The device of claim 29, wherein said partition is vertically movable.

33. The device of claim 29, wherein said partition comprises means for regulation of the height thereof so that it is possible to immerse said partition in the bath to a predetermined depth of at least 20% of the tank.

34. The device of claim 29, wherein said electrodes of said second compartment provide means for localized heating of the molten glass therein.

35. The device of claim 34, wherein said electrodes are placed in the same longitudinal plane.

36. The device of claim 35, wherein said electrodes are placed vertically, the interval between end electrodes being between 0.8 and 1.2 times the width of the second compartment.

37. The device of claim 29, wherein one or more electrodes are mounted in said first compartment to generate convective loops of molten glass which limit the generation of convective loops of molten glass from said electrodes of said second compartment.

38. The device of claim 29 wherein said second compartment forms a molten glass homogenizing zone.

39. The device of claim 29, wherein said electrodes are located at a distance from a compartment wall of no more than three times the depth of the bath at the site of said electrode.

40. The device of claim 39, wherein the electrodes are located at between half and twice said depth.

41. The device of claim 29 wherein a plurality of electrodes are mounted in said second compartment symmetrically relative to a longitudinal plane of symmetry through said second compartment.

42. The device of claim 9 wherein a plurality of electrodes are mounted in said second compartment symmetrically relative to a longitudinal plane of symmetry through said second compartment.

* * * * *